TELEPHONE LOCK

Filed July 11, 1966

INVENTOR.
PHILIP D. BART
BY
ATTORNEY

United States Patent Office 3,495,050

Patented Feb. 10, 1970

3,495,050

TELEPHONE LOCK

Philip D. Bart, 27 Keith Drive, Monsey, N.Y. 10952

Filed July 11, 1966, Ser. No. 564,331

Int. Cl. H04m 1/66

U.S. Cl. 179—189 6 Claims

ABSTRACT OF THE DISCLOSURE

A telephone dialing area shield and lock having one or two hook-ended arms for engaging a recess on the telephone base. The lock acts to allow disengagement of the engaging arm, as by a key actuated rotation.

The present invention relates to a telephone lock and more particularly to a device for selectively permitting or preventing access to the dial portion of a telephone base.

Telephone locks have been heretofore confined to that class of devices which prevents rotation of the telephone base rotary dialing mechanism by means of an insertion in one of the spaced holes therein, or by means of inhibiting removal of the handset. The former, while effective, is easily circumvented by removal of the dial finger stop and is not at all practical on the push-button type of telephones. The latter is bulky and difficult to install, and undesirably restricts incoming calls.

Similarly, prior telephone locks are too complex to be practical because of a multiplicity of components, difficult to manufacture and incompatible between varying types of telephones such as those of the rotary dial and push-button variety. Furthermore, it is often desirable to provide for obscuring the dialing number of a particular telephone to prevent unauthorized calls being made through an operator without the use of the rotary dial or push-button array.

It is therefore a prime object of this invention to provide a locking device which will selectively prevent or permit access to the rotary dial or push-button array of a telephone base.

It is a further object of the invention to provide a locking device which may be used interchangeably on either a rotary dial or push-button telephone base.

It is a still further object of the invention to provide a locking device which is easily and simply installed, upon either a rotary dial or push-button telephone base, and will not restrict incoming calls.

It is an object of the invention to provide a locking device for a telephone which will serve to obscure the dialing number of the subject telephone.

It is an object of the invention to provide a locking device for a telephone which is simple, compact, economical, durable, easily manufactured, and of unitary construction.

A telephone lock in accordance with the present invention features a shielding member which is shaped so as to engage the base portion of a table or wall telephone assembly in such a manner as to prevent access to the dialing area on the face of the telephone base when the lock is in locked position. An extensible means or member, properly shaped to accommodate either the table model or wall model telephone base, is slidably mounted on the shielding member in such a manner as to allow sufficient freedom to the extensible member to assume either of two positions; the first position being the locking position, the second the releasing position. In the first position the extensible member engages the telephone base in a manner sufficient to prevent removal of the shield, thereby preventing access to the dialing area, while in the second position the extensible member disengages from its position with relation to the telephone base in a manner sufficient to allow removal of the shielding member and thereby permit access to the dialing area. A suitable locking means is mounted on the shielding member and connected to the extensible means to permit the selective disposition of the extensible means between either the first or second position.

The foregoing features and objects, as well as other features, objects and advantages of the present invention will become apparent and be more fully understood from the following detailed description of certain preferred embodiments herein, taken in connection with the accompanying drawings wherein.

Figure 1:
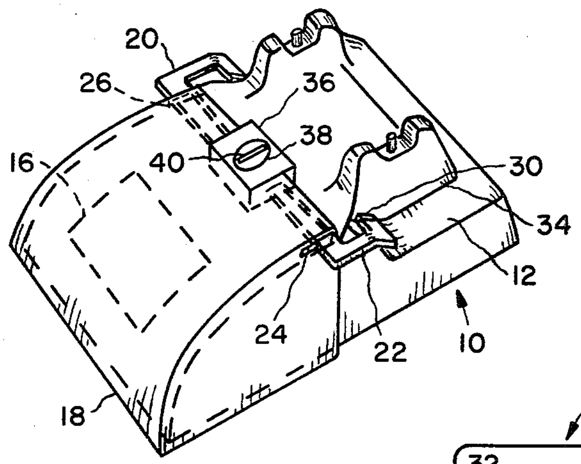
FIG. 1 is a perspective view of a telephone base employing a preferred embodiment of the locking device of the present invention.

Referring now to the drawings there is illustrated a telephone base 10 of the table model variety having a first and second recessed portions 12 and 14 each respectively positioned in symmetric relation on opposing sides of the telephone base. On the front face of the telephone base 10 in conventional location there is illustrated a dialing area 16 which may include alternatively the spaced finger hole rotary dial or the push-button mechanism, it being appreciated that the locking device of the present invention is compatible with either. A shielding member 18 which may be either a complete cover or a partial shell, and which may be metallic or be composed of a high impact phenolic plastic, preferably opaque to prevent observation of the legends or information contained in the dialing area, slidably mounts or engages the telephone base 10 and is structurally dimensioned so that, when fully positioned on the base 10, the member 18 will serve to completely shield the dialing area 16.

Toward the uppermost segment of the shielding member 18 is positioned an extensible member which is best illustrated perspectively in FIGURE 1 and preferably comprises first and second substantially hook-shaped bracket members 20 and 22 which may be metallic or be composed of a high impact phenolic plastic.

It will be appreciated that only one extensible bracket member may be used, as, for example, a long member extending beneath the telephone base, or laterally around the base, and engaging a suitable base recess for locking, but the additional security and structural support of two opposing brackets is desirable. The bracket members are each slidably mounted to the shielding member 18 in such a manner as to allow a lateral or other type of extending or shifting motion. As illustrated in FIGURE 1 the shield is provided with slits or openings 24 and 26, respectively, which permit the slidable movement of the bracket members for the reasons discussed in further detail below.

When the shielding member 18 is in full engagement with the telephone base 10, bracket members 20 and 22 may then be lock positioned. In the lock position, the ends 28 and 30 of the bracket members 20 and 22 respectively are juxtaposed in an engageable relationship with the recessed portions 14 and 12 respectively of the telephone base 10 sufficient to block removal of the shielding member 18. In this regard, the bracket ends 28 and 30 may actually contact the cradle side walls, 32 and 34 respectively, for a positive friction contact. In order to protect the finish of the telephone base it is possible to coat or cover each of the bracket ends with a soft rubber or plastic compound without impairing the efficiency of the locking device. To insure a positive engagement with the telephone base, the end portions of the bracket members 20 and 22 may be shaped, as with a slight twist, to allow the brackets to lie in a plane substantially parallel to the plane formed by the recessed portions 14 and 12, as best illustrated in FIGURE. 1.

Figure 3:
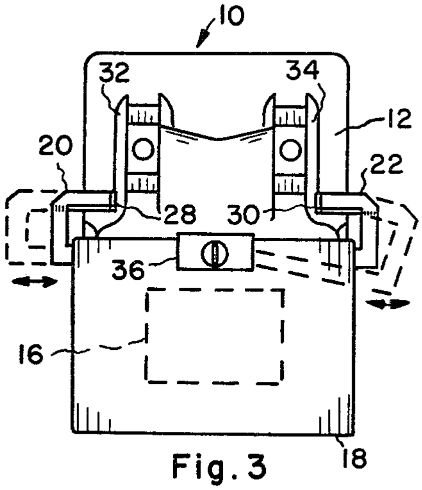
FIG. 3 is a top view of the perspective of FIGURE 1.

Locking of the bracket members into the first or locking position is accomplished by virtue of a suitable locking means 36 which is mounted to the shielding member 18 and connected to the bracket members 20 and 22. The locking means is operable, by means of a key or the equivalent thereof, to mechanically allow the bracket members to be locked in either of the two basic positions necessary: lock and release. The lock position, as described above, prevents sliding disengagement of the shield member 18. The release position, effected by keyed rotation of the lock, causes bracket members 20 and 22 to slide laterally away in a rotating or linear manner or in a combinational manner from the recessed portions 14 and 12 of the telephone base 10 and thereby permit sliding disengagement of the shielding member 18. The effect of a laterally rotating extension of the bracket members is sectionally illustrated for the bracket member 22 in FIGURE 3, while a laterally linear extension is similarly illustrated for the bracket 20, also in FIGURE 3.

Figure 4:
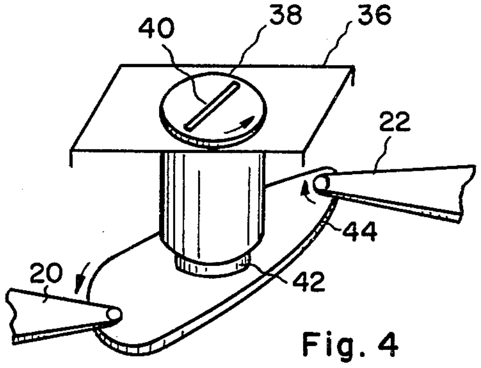
FIG. 4 is a preferred embodiment of a lock used in connection with the present invention.

A preferred mechanism for actuating the bracket members into position is illustrated in FIG. 4 wherein there is shown a cylindrical lock 38 fixed or rigidly mounted as by a flange or the like to the locking means 36, which means may actually be formed as part of the shielding member 18 or be assembled as a separate unit for later integration into the shielding member. The locking means 36 is provided with a suitable structural support for maintaining the bracket members 20 and 22 in proper operative positions, as best illustrated sectionally in FIGURE 1. The lock 38 has an inner rotatable portion 40 for key actuation and also includes a shaft member 42 which serves as the transmitter of key rotational movement to the bracket members 20 and 22. The shaft member 42 has affixed thereto, in a plane substantially orthogonal to the longitudinal axis of said shaft member 42, a disc shaped member 44 with provision on the circumferential portion thereof for a pivotal connection to each of the bracket members 20 and 22. The connections are preferably made at substantially opposing areas of said disc. Rotation of the key actuatable portion of the lock 38 will therefore result in rotation of the shaft member and the disc member, and therefore a corresponding lateral movement of the bracket members. The disc member 44 will be of sufficient dimension to allow a first position of the brackets sufficient to block removal of the shielding member from the base, whereas rotation of the disc member 44 will result in extension of the brackets by a sufficient linear distance to allow the hooked portions thereof to clear the recessed indentation portions 12 and 14 on the telephone base and thereby allow removal of the shielding member.

Figure 5:
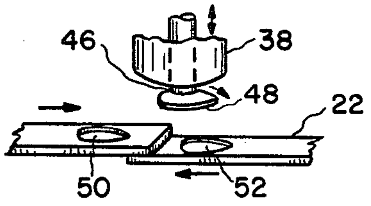
FIG. 5 is an alternative embodiment of a lock used in connection with the present invention.

An alternative form of locking means is illustrated in FIG. 5. In this embodiment, the cylindrical lock 38 is provided with a key actuatable, longitudinally extensible, central rotating shaft 46 having a cam 48 fixedly positioned on the end thereof. The bracket members 20 and 22 are here provided with cam shaped openings 50 and 52. To lock the bracket members into position, it is here necessary to manually or by other external means compress the members in the direction illustrated until the cam shaped openings 50 and 52 are aligned. Cam 48 is then caused to drop through the openings 50 and 52, as by gravity or other suitable means of force. Shaft 46 may now be rotated, as by means of a key inserted into lock 38, and locked in position to prevent separation of the bracket members. The bracket members may be spring biased to insure positive disengagement when unlocked and released.

Figure 2:
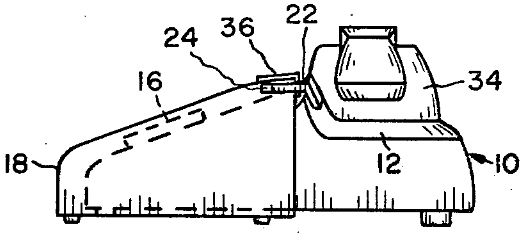
FIG. 2 is a side view of the perspective of FIGURE 1.
Figure 6:
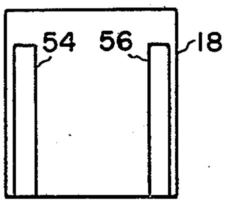
FIG. 6 is a bottom view of a preferred embodiment of the locking device of the present invention.
Figure 7:
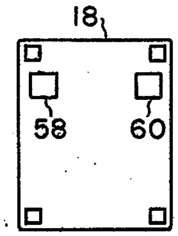
FIG. 7 is a bottom view of an alternative embodiment of the locking device of the present invention.

Because a table model telephone base is commonly provided with felt pads or similar non-marring surface contactors, the shielding member 18 of the present invention may be provided, in the underportion thereof, with a pair of slotted openings 54 and 56, illustrated in FIG. 6. This permits ease in sliding the telephone base into the shielding member, and allows the member to be closely fitted to the base. Alternatively, the shielding member can be unslotted in its under-construction having only suitably positioned openings 58 and 60 to accommodate the telephone base pads, as illustrated in FIGS. 2 and 7. Finally, if desired, no provision need be made, and the telephone base can be slidably fitted to the shielding member without impairing the operation of the invention, as shown in FIG. 2. Additionally, the shielding member 18 may be fitted with its own base pads, diagrammatically present in FIGS. 2 and 7.

Although the foregoing embodiment has been described for a table model telephone, it will be apparent that the invention may be practiced on a wall model telephone base merely by proper shaping of the extensible member described above to take advantage of the wall model geometry. For example, the extensible member can be shaped so as to partially slip between the wall and the base, thereby assuming a positive mechanical engagement for the lock position. In furtherance of said example, the wall model shielding member would not be provided with a closed underportion, but rather be shaped in a manner allowing ease of placement over the wall telephone base dialing area.

It will be understood that many other modifications and variations may be effected within the scope of the novel conceptions of this invention, which is to be construed and defined solely by the scope of the appended claims.

I claim:

1. A telephone dial shielding device for selectively permitting or preventing access to the dialing area of a telephone base, comprising a shield positionable upon said telephone base for covering said dialing area, said shield including a member extending from said shield and having a hook shaped portion for engaging a recess in said telephone base, first means mounted to said shield for movement between a first position permitting said member to engage said telephone base and a second position permitting said member to disengage said telephone base, locking means mounted to said shield and connected to said first means, said locking means selectively disposing said first means to said first position for preventing removal of said shield, and to said second position for permitting removal of said shield.

2. The combination of claim 1 wherein said telephone base includes first and second recessed portions each respectively positioned in symmetric relation on opposing sides of said telephone base, and said member comprises first and second substantially hook-shaped brackets, each of said brackets having an end thereof juxtaposed in an engageable relation with a respective one of said recessed portions when said first means is disposed by said locking means to said first position.

3. The combination of claim 1 wherein said locking means includes a rotatable key actuated cylindrical lock having a fixed outer portion for said mounting to said shield, and an inner portion including a shaft rotatably positioned by selective rotation of said key, said member being pivotally connected to said shaft for transmitting said key rotation to said member.

4. The combination of claim 1 wherein said shield is opaque for preventing visual observation of the legends on said dialing area.

5. In combination with a telephone assembly including a telephone base having first and second recessed portions each respectively positioned in symmetric relation on opposing sides of said telephone base and a dialing area positioned on the face of said telephone base, a telephone dial shielding device for selectively permitting or preventing access to said dialing area comprising: a shielding member slidably positionable upon said telephone base for enclosing said dialing area, first and second laterally extensible substantially hook-shaped bracket members, said first and second members slidably mounted on said shielding member for movement between a first position and a second position, each of said members having an operative end thereof juxtaposed in an engageable relation with a respective one of said recessed portions when said members are disposed to said first position to prevent slidable disengagement of said shielding member, each of said operative ends having a nonengageable relation with a respective one of said recessed portions when said bracket members are disposed to said second position to permit slidable disengagement of said shielding member, locking means rigidly mounted to said shielding member and connected to each of said bracket members, said locking means including a rotatable key actuated cylindrical lock having a fixed outer portion for said rigid mounting to said shielding member, and a rotating inner portion including a shaft member rotatably positioned by selective actuation of said key, each of said bracket members being pivotally connected to said shaft member for transmitting said key rotation to said bracket members.

6. The combination of claim 5 wherein said shaft member includes a substantially disc shaped member positioned on the end of said shaft in a plane substantially orthogonal to the axis of said shaft, and means for pivotally attaching the remaining ends of each of said bracket members to first and second substantially opposing positions on a circumferential area defined by said disc shaped member.

References Cited

UNITED STATES PATENTS

| | | | |
|---|---|---|---|
| 1,832,494 | 11/1931 | Martin ------------ | 179—189 |
| 1,620,628 | 3/1927 | Beth --------------- | 179—189 |

KATHLEEN H. CLAFFY, Primary Examiner

ALBERT B. KIMBALL, Jr., Assistant Examiner